(12) United States Patent
Okada (10) Patent No.: US 10,005,154 B2
(45) Date of Patent: Jun. 26, 2018

(54) LASER PROCESSING MACHINE

(71) Applicant: MURATA MACHINERY, LTD., Kyoto-shi, Kyoto (JP)

(72) Inventor: Takuya Okada, Kyoto (JP)

(73) Assignee: MURATA MACHINERY, LTD., Kyoto (JP)

( * ) Notice: Subject to any disclaimer, the term of this patent is extended or adjusted under 35 U.S.C. 154(b) by 701 days.

(21) Appl. No.: 14/377,908

(22) PCT Filed: Jan. 16, 2013

(86) PCT No.: PCT/JP2013/050658
§ 371 (c)(1),
(2) Date: Aug. 11, 2014

(87) PCT Pub. No.: WO2013/121818
PCT Pub. Date: Aug. 22, 2013

(65) Prior Publication Data
US 2015/0001195 A1   Jan. 1, 2015

(30) Foreign Application Priority Data

Feb. 14, 2012  (JP) ................................. 2012-029152

(51) Int. Cl.
*B23K 26/00* (2014.01)
*B23K 26/14* (2014.01)
(Continued)

(52) U.S. Cl.
CPC ............ *B23K 26/08* (2013.01); *B23K 26/082* (2015.10); *B23K 26/0876* (2013.01);
(Continued)

(58) Field of Classification Search
CPC .. B23K 26/142; B23K 26/38; B23K 26/0884; B23K 26/123; B23K 26/147; B23K 26/1438
(Continued)

(56) References Cited

U.S. PATENT DOCUMENTS 4,332,999 A * 6/1982 Wittke .................. B23K 26/147
219/121.67
4,638,145 A * 1/1987 Sakuma ............. B23K 26/0853
219/121.61
(Continued)

FOREIGN PATENT DOCUMENTS

CN     101935156 A     1/2011
CN     102159358 A     8/2011
(Continued)

OTHER PUBLICATIONS

English translation of Official Communication issued in corresponding International Application PCT/JP2013/050658, dated Aug. 28, 2014.
(Continued)

*Primary Examiner* — Dana Ross
*Assistant Examiner* — Lawrence Samuels (57) ABSTRACT

An optical system head of the laser processing machine includes a focusing optical system configured to deflect and condense an incident laser beam so that a target object to be processed is irradiated and a deflecting direction adjusting unit configured to adjust the direction of deflection of the laser beams about at least two axes perpendicular or substantially perpendicular to each other. A nozzle holding head of the laser processing machine includes a cutting nozzle configured to blow a cutting gas at a site of the target object, at which the laser beam is irradiated, and a nozzle position adjusting unit configured to adjust the position of the cutting nozzle in a top plane parallel or substantially parallel to the
(Continued)

target object. The optical system head and the nozzle holding head are separately supported by an optical system nozzle support member configured to selectively advance or retract in three axis directions relative to the target object.

4 Claims, 8 Drawing Sheets

(51) Int. Cl.
  *B23K 26/08* (2014.01)
  *B23K 26/38* (2014.01)
  *B23K 26/142* (2014.01)
  *B23K 26/082* (2014.01)

(52) U.S. Cl.
  CPC ............ *B23K 26/14* (2013.01); *B23K 26/142* (2015.10); *B23K 26/38* (2013.01)

(58) Field of Classification Search
  USPC .............. 219/121.84, 121.67, 121.78, 121.72
  See application file for complete search history.

(56) References Cited

U.S. PATENT DOCUMENTS

| | | | | |
|---|---|---|---|---|
| 4,675,501 A * | 6/1987 | Klingel | ................. | B23K 26/04 219/121.67 |
| 4,892,992 A * | 1/1990 | Akeel | ................. | B23K 26/0884 219/121.78 |
| 5,061,839 A * | 10/1991 | Matsuno | ............ | B23K 26/1476 219/121.75 |
| 5,093,549 A * | 3/1992 | Iwai | ................. | B23K 26/0853 219/121.67 |
| 6,111,214 A * | 8/2000 | Saito | .................... | B23K 26/147 219/121.6 |
| 6,198,070 B1 * | 3/2001 | Nakayama | ......... | B23K 26/1476 219/121.68 |
| 6,204,473 B1 * | 3/2001 | Legge | ................. | B23K 26/037 219/121.67 |
| 6,316,743 B1 * | 11/2001 | Nagahori | ............... | B23K 26/04 219/121.67 |
| 6,384,370 B1 * | 5/2002 | Tsunemi | .............. | B08B 7/0042 219/121.69 |
| 6,417,487 B2 * | 7/2002 | Nagura | .............. | B23K 26/0604 219/121.77 |
| 6,469,274 B1 * | 10/2002 | Delzenne | ............... | B23K 10/00 219/121.39 |
| 7,294,807 B2 * | 11/2007 | Callies | ................. | B23K 26/123 219/121.71 |
| 7,319,204 B2 * | 1/2008 | Schafer | ............. | B23K 26/0648 219/121.63 |
| 8,448,471 B2 | 5/2013 | Kumatani et al. | | |
| 8,487,209 B2 * | 7/2013 | Sakamoto | .......... | B23K 26/0884 219/121.63 |
| 8,872,065 B2 * | 10/2014 | Pluss | ................. | B23K 26/0823 219/121.7 |
| 2001/0029365 A1 * | 10/2001 | Nagahori | ........... | B23K 26/1494 606/13 |
| 2003/0217809 A1 * | 11/2003 | Morishige | .............. | B23K 26/03 156/345.5 |
| 2004/0104203 A1 * | 6/2004 | Yamaguchi | .............. | B23K 5/22 219/121.36 |
| 2004/0245226 A1 * | 12/2004 | Callies | ................. | B23K 26/123 219/121.71 |
| 2005/0224470 A1 * | 10/2005 | Burt | ..................... | B23K 26/147 219/121.63 |
| 2006/0011592 A1 * | 1/2006 | Wang | .................... | B23K 26/032 219/121.64 |
| 2006/0091126 A1 * | 5/2006 | Baird | ................. | B23K 26/0604 219/121.72 |
| 2006/0102600 A1 * | 5/2006 | Schafer | ............. | B23K 26/0648 219/121.64 |
| 2007/0145026 A1 * | 6/2007 | Murase | .............. | B23K 26/1462 219/121.84 |
| 2007/0210040 A1 * | 9/2007 | Sakamoto | .......... | B23K 26/0884 219/121.63 |
| 2007/0228021 A1 * | 10/2007 | Wagou | ................. | B23K 1/0056 219/121.63 |
| 2007/0228025 A1 * | 10/2007 | Horn | ..................... | B23K 26/04 219/121.78 |
| 2007/0241086 A1 * | 10/2007 | Arao | ................. | B23K 26/0732 219/121.84 |
| 2009/0127239 A1 * | 5/2009 | Numata | ................. | B23K 26/40 219/121.71 |
| 2009/0250445 A1 * | 10/2009 | Yamaguchi | .......... | B23K 10/006 219/121.72 |
| 2010/0096370 A1 * | 4/2010 | Yamazaki | ............ | B23K 26/046 219/121.67 |
| 2010/0301013 A1 * | 12/2010 | Conneely | ............. | B23K 26/032 216/83 |
| 2010/0326138 A1 | 12/2010 | Kumatani et al. | | |
| 2011/0114610 A1 * | 5/2011 | Szelagowski | ........ | B23K 26/142 219/121.71 |
| 2011/0120981 A1 * | 5/2011 | Paganelli | ........... | B23K 26/0823 219/121.67 |
| 2011/0220625 A1 * | 9/2011 | Pluss | ................... | B23K 26/0823 219/121.72 |
| 2013/0026144 A1 * | 1/2013 | Kurosawa | .............. | B23K 26/14 219/121.71 |
| 2015/0343561 A1 * | 12/2015 | Miller | ................. | B23K 26/046 219/121.81 |

FOREIGN PATENT DOCUMENTS

| | | |
|---|---|---|
| JP | 04-238687 A | 8/1992 |
| JP | 07-032183 A | 2/1995 |
| WO | 2009/146697 A1 | 12/2009 |

OTHER PUBLICATIONS

Official Communication issued in International Patent Application No. PCT/JP2013/050658, dated Apr. 16, 2013.

\* cited by examiner

LASER PROCESSING MACHINE

CROSS REFERENCE TO THE RELATED APPLICATION

This application is based on and claims Convention priority to Japanese patent application No. 2012-029152, filed Feb. 14, 2012, the entire disclosure of which is herein incorporated by reference as a part of this application.

BACKGROUND OF THE INVENTION

1. Field of the Invention

The present invention relates to a laser processing machine for cutting a target object to be processed with a laser beam and, more particularly, to a laser processing machine capable of adjusting a laser beam irradiated position on a target object by deflecting such laser beam.

2. Description of the Related Art

The laser processing machine generally includes an optical system such as, for example, a condensing lens, which is operable to condense the incident laser beam and then irradiate a target object to be processed, and a processing head provided with a cutting nozzle for blowing a cutting gas at a portion of the target object where the laser beam is irradiated. The laser processing machine is designed so as to accomplish the processing such as, for example, cutting with the laser beam while the processing head is relatively moved in three axes that are perpendicular to each other.

In the meantime, the processing head referred to above includes a number of component parts, and thus it is relatively heavy. For this reason, when the processing head as a whole is to be moved, a force of inertia acts enough to make it difficult to accomplish the quick and precise change of direction and quick and precise acceleration or deceleration. In view of this, WO2009/146697 A1, for example, suggests a processing technique such that, while use is made of a deflecting direction adjusting unit in the optical system to enable the laser beam to be deflected about the two axes perpendicular to each other, so that in a long distance section such as, for example, a straight path, the processing head in whole may be moved to accomplish the processing whereas in a short distance section such as, for example, a corner or a curve, the angle of deflection of the laser beam may be adjusted.

In the laser processing machine, the higher the accelerating or decelerating speed is required in processing, the greater vibration source the cutting head becomes. Also, even in WO2009/146697 A1, in which the movable unit weight is made relatively lightweight, the provision of the optical system and the cutting nozzle in the same processing head results in that vibrations of the cutting nozzle are transmitted to the optical system, thus making it possible for the vibrations of the cutting nozzle to adversely affect the optical system.

SUMMARY OF THE INVENTION

In view of the foregoing, preferred embodiments of the present invention provide a laser processing machine configured to finely adjust a laser beam irradiated position on a target object to be processed through deflection of a laser beam to significantly reduce or prevent adverse influences on the optical system caused by vibrations of a cutting nozzle.

According to a preferred embodiment of the present invention, a laser processing machine includes an optical system head including a focusing optical system configured to irradiate a target object to be processed by deflecting and condensing a laser beam incident thereupon, and a deflecting direction adjusting unit configured to adjust a direction of deflection of the laser beam from the focusing optical system about at least two axes perpendicular or substantially perpendicular to each other; and a nozzle holding head including a cutting nozzle configured to blow a cutting gas to a site of the target object to be processed which is irradiated by the laser beam, and a nozzle position adjusting unit configured to adjust a position of the cutting nozzle in a top plan parallel or substantially parallel to the target object to be processed in synchronism with an operation of the deflecting direction adjusting unit. In this laser processing machine, the optical system head and the nozzle holding head preferably are separately supported by an optical system nozzle support member which is selectively advanced or retracted relative to the target object in three axis directions perpendicular or substantially perpendicular to each other.

According to a preferred embodiment of the present invention, since the optical system head and the nozzle holding head are separately supported by the optical system nozzle support member, it is possible to make vibrations of the cutting nozzle in the nozzle holding head hard to be transmitted to the focusing optical system in the optical system head. Specifically, support may be accomplished through a vibration isolating material. Also, a support structure may be of a type in which the natural frequency increases. Accordingly, adverse influences caused by the focusing optical system on the deflection of the laser beam are significantly reduced or prevented. For this reason, a highly accurate processing is accomplished.

In a preferred embodiment of the present invention, the nozzle position adjusting unit preferably is operable to perform an operation to withdraw the cutting nozzle out of a region, in which the cutting gas is blown to the target object to be processed, separately from an operation to adjust the position of the cutting nozzle in synchronism with the operation of the deflecting direction adjusting unit, in which case a calculation block may be used to determine which one of the operation to perform the adjustment in the synchronism and the operation to withdraw the cutting nozzle out of the region the nozzle position adjusting unit should perform.

According to the above described feature, when the processing is to be performed with no cutting gas blown to the target object to be processed, withdrawal of the cutting nozzle to the outside of the processing region is effective to avoid a possible interference brought about by the cutting nozzle.

In another preferred embodiment of the present invention, the nozzle position adjusting unit preferably includes two pivot arms provided in a base member, which is supported by the optical system nozzle support member, so as to pivot about an axis perpendicular or substantially perpendicular to the target object to be processed, two pivot drive sources to pivot the respective two pivot arms, and two guide rails fixed directly or indirectly to the cutting nozzle so as to lie parallel or substantially parallel to and perpendicular or substantially perpendicular to the target object to be processed, the two guide rails being operable to slidingly guide respective pivot ends of the two pivot arms.

When the pivot arms are pivoted by the pivot drive sources, the pivot ends of the pivot arms are moved along the guide rails to accomplish a position conversion of the guide rails in a direction transverse to the lengthwise direction thereof. By so doing, the cutting nozzle fixed directly or indirectly to the guide rails also undergoes the position conversion. Since the two guide rails extend in respective directions perpendicular or substantially perpendicular to each other, by the pivot movement of each of the pivot arms, the cutting nozzle undergoes the position conversion in two axis directions transverse to each other. Accordingly, when the two pivot arms are pivoted respective proper angles, the cutting nozzle is capable of being positioned at the arbitrarily chosen target position. The pivot arms are parallel or substantially parallel to each other and, whichever the pivot arm is pivoted, an equal or nearly equal load acts on the pivot drive sources. For this reason, without the position conversion in one axial direction affecting the position conversion in the other axial direction, the positioning in the two axis direction transverse to each other is accomplished with equal accuracy. In other words, accumulation of errors, which would occur when the standard series relation (piggyback construction) is used, is eliminated.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
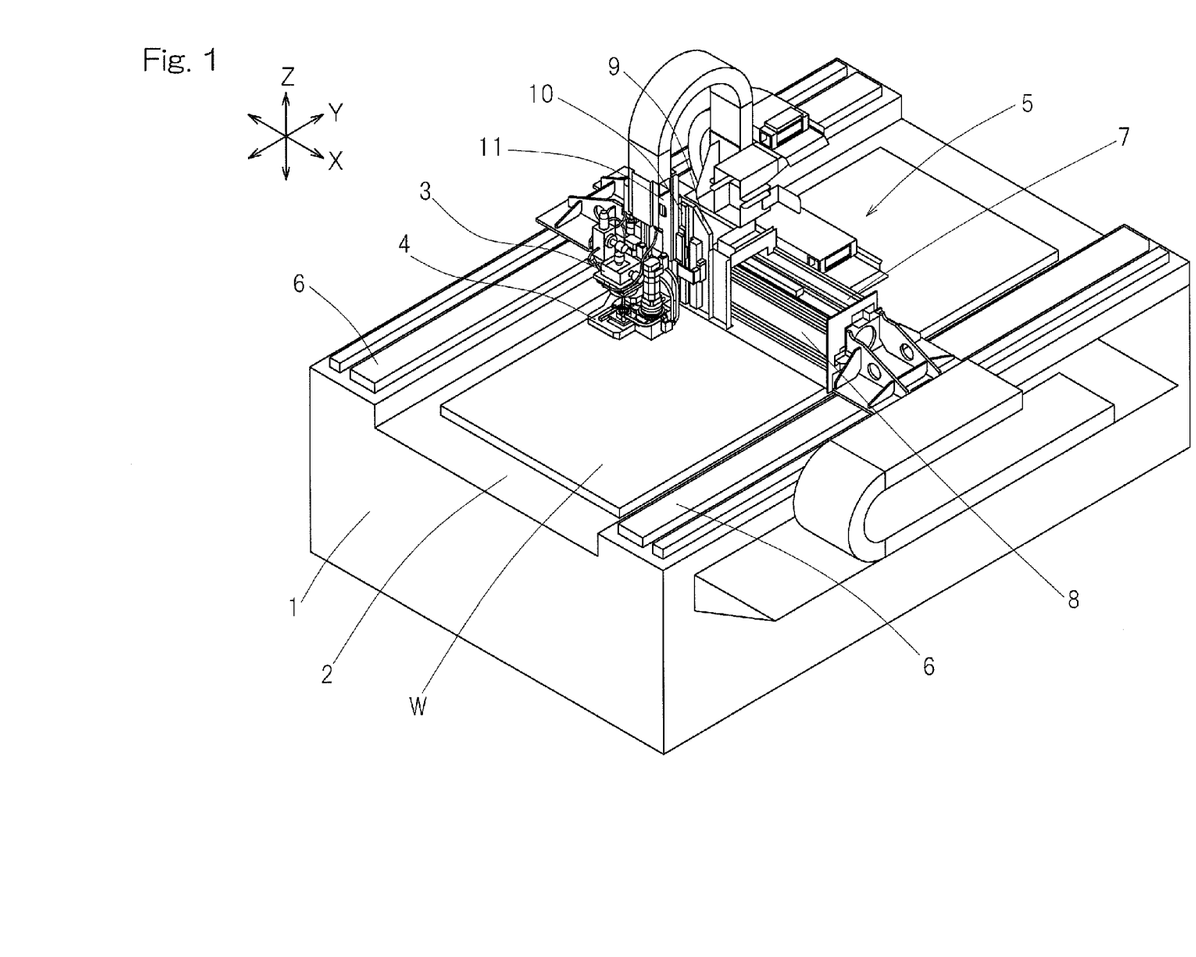
FIG. 1 is a perspective view showing a laser processing machine designed in accordance with a preferred embodiment of the present invention.

Preferred embodiments of the present invention will now be described with particular reference to the accompanying drawings. Referring to FIG. 1 which shows an overall perspective view, a laser processing machine according to a preferred embodiment of the present invention includes a bed 1 and a table 2 provided on the bed 1, and a target object W to be processed, prepared from a plate material, is placed on the table 2. The laser processing machine is configured to perform, for example, a cutting process on the target object W to be processed having been placed on the table 2, with an optical system head 3 and a nozzle holding head 4 being moved in three axes directions perpendicular or substantially perpendicular to each other.

Figure 2:
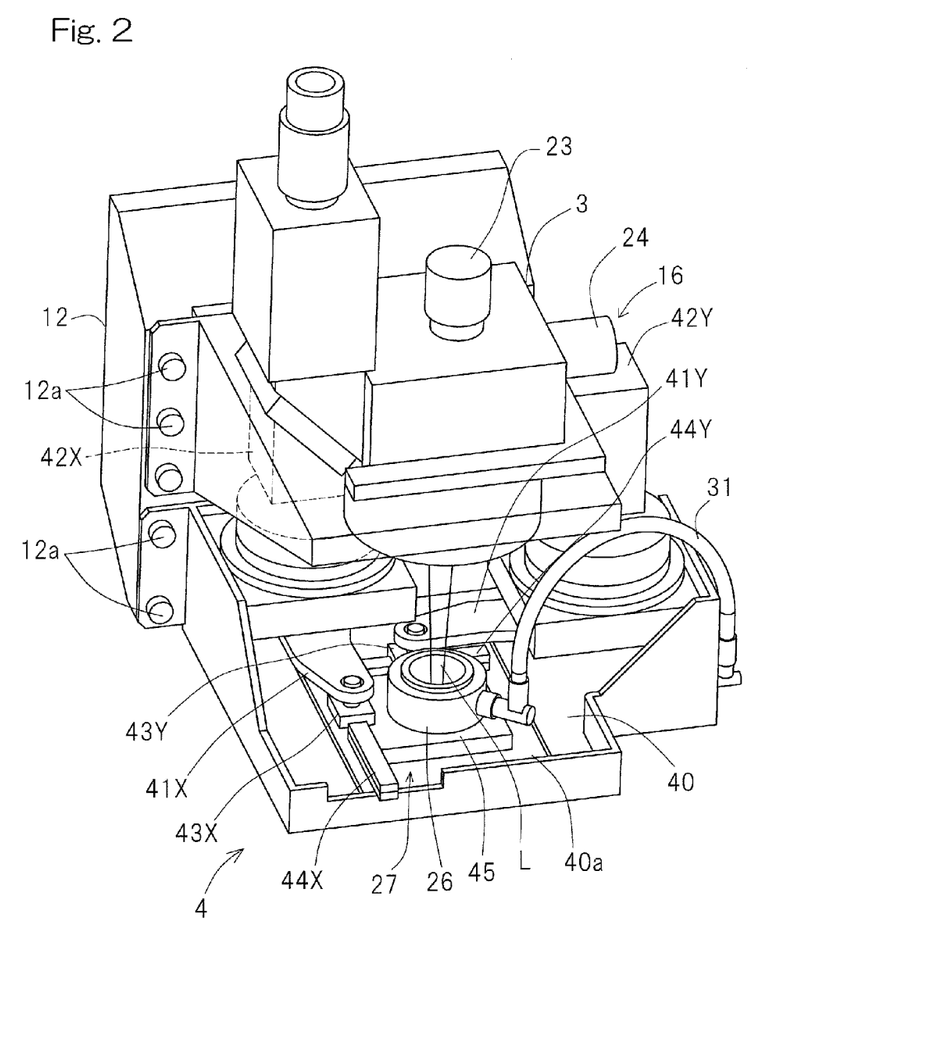
FIG. 2 is a perspective view showing an optical system head and a nozzle holding head both included in the laser processing machine.

The optical system head 3 and the nozzle holding head 4 are moved by an XYZ axes moving mechanism 5. The XYZ axes moving mechanism 5 includes a Y axis movable body 7, an X axis movable body 9 and a Z axis movable body 11. The Y axis movable body 7 is configured to selectively advance and retract in a forward and rearward direction (a Y axis direction) along a pair of left and right Y axis rails 6 disposed on left and right side portions of an upper surface of the bed 1. The X axis movable body 9 is configured to selectively advance and retract in a leftward and rightward direction (a X axis direction) along an X axis rail 8 disposed on a front surface of the Y axis movable body 7. The Z axis movable body 11 is configured to selectively advance and retract in an upward and downward direction (a Z axis direction) along a Z axis rail 10 disposed on a front surface of the X axis movable body 9. The selective advance and retraction of each of the X,Y and Z axis movable bodies 9, 7 and 11 is accomplished by, for example, a respective linear motor. As shown in FIG. 2, the optical system head 3 and the nozzle holding head 4 are respectively connected preferably by bolts 12a, for example, with respective upper and lower portions of an elevational surface of the optical system nozzle support member 12. The optical system head 3 and the nozzle holding head 4 are supported so as to have no connected relationship.

Figure 3:
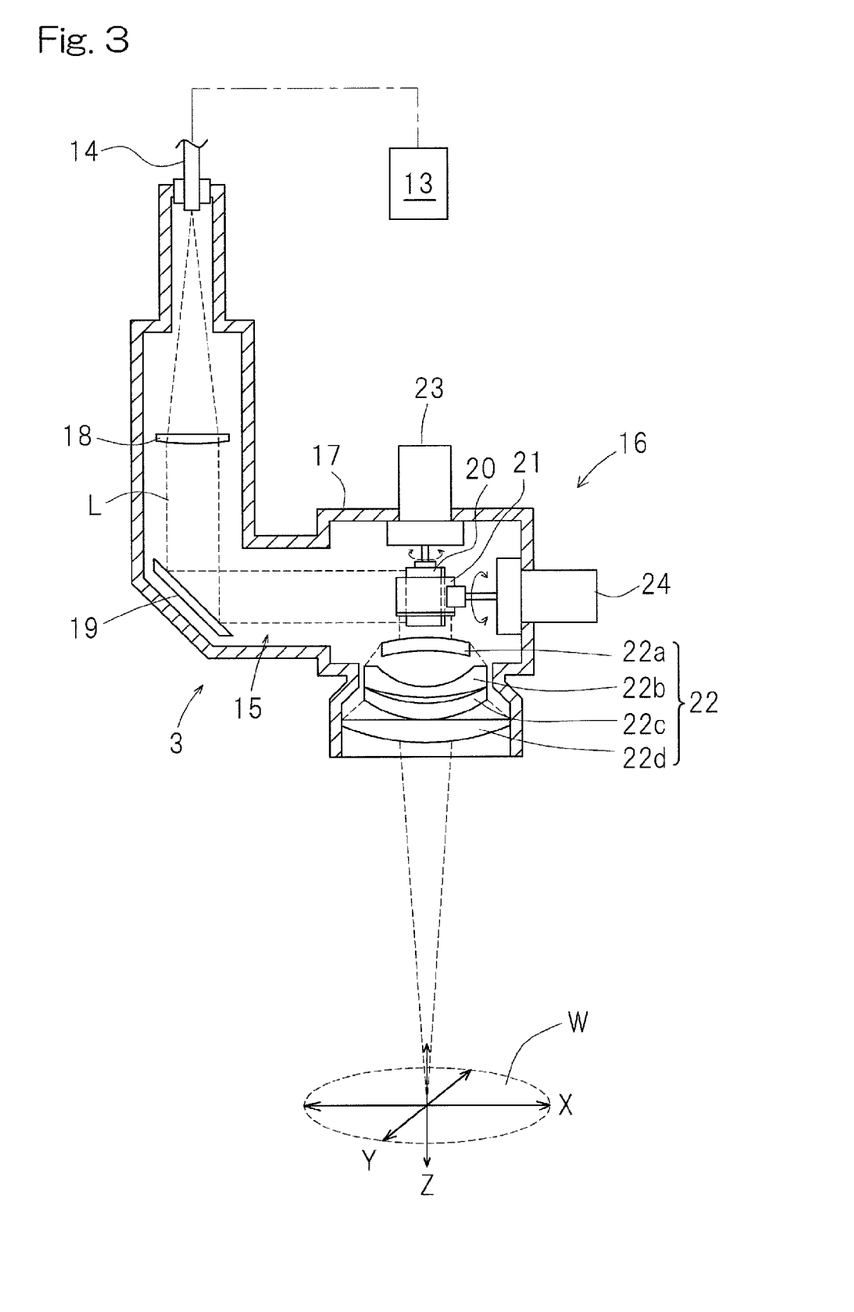
FIG. 3 is a sectional view showing an interior structure of the optical system head.

As shown in FIG. 3, a laser beam L oscillated by a laser oscillator 13 is impinged on the optical system head 3 through a transmission optical fiber 14. The laser oscillator 13 preferably is, for example, a solid state laser oscillator. The optical system head 3 includes a focusing optical system 15 configured to deflect and condense the incident laser beam L to irradiate the target object W to be processed and a deflecting direction adjusting unit 16 configured to adjust the direction of deflection of the laser beam L from the focusing optical system 15 about two axes perpendicular or substantially perpendicular to each other.

Figure 4:
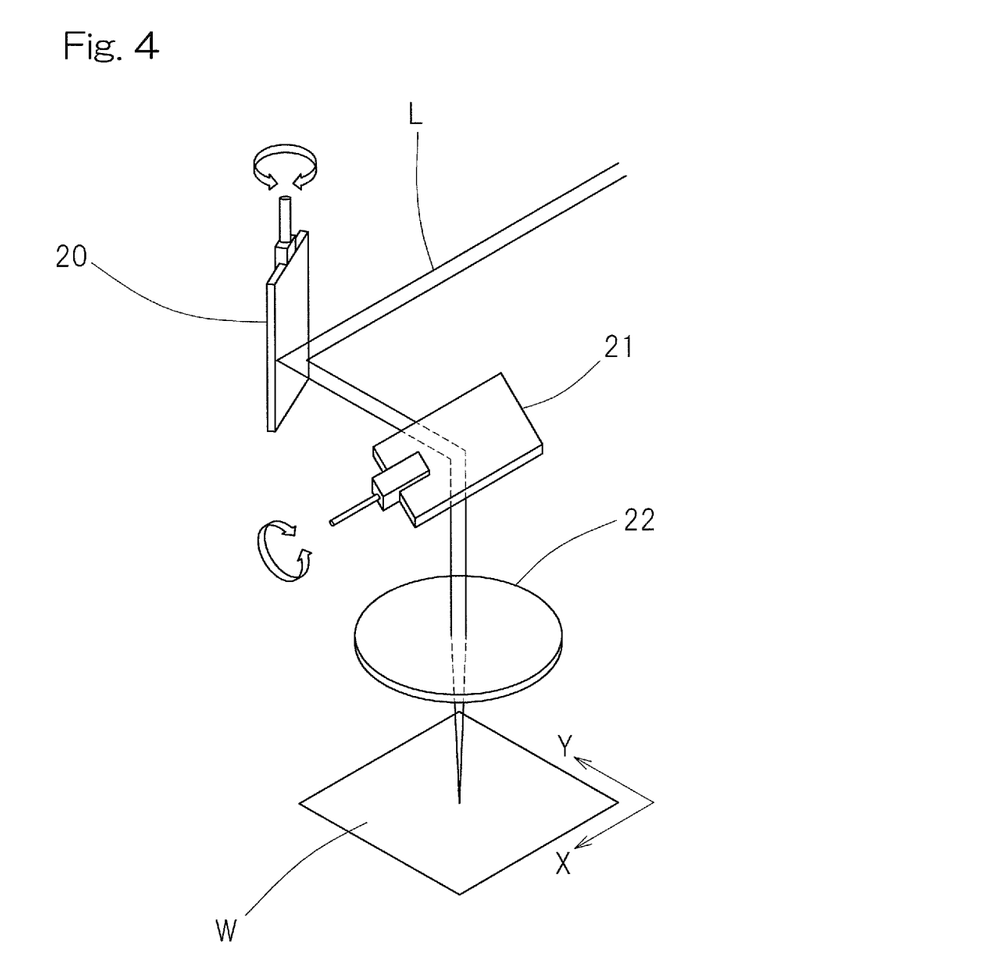
FIG. 4 is a perspective view showing an X axis direction scanning mirror, a Y-axis direction scanning mirror and a scanning lens in the optical system head.

The focusing optical system 15 preferably includes a plurality of lenses and mirrors both disposed inside an optical system head housing 17 fixed to the optical system nozzle support member 12. A collimate lens 18 collimates the laser beam L which is emitted having been dispersed from a tip end of the transmission optical fiber 14. A reflecting mirror 19 reflects the collimated laser beam L towards an X axis direction scanning mirror 20. The X axis direction scanning mirror 20 is rotatable about an axis extending in the upward and downward direction (Z axis direction) and is operable to reflect the laser beam L from the reflecting mirror 19 towards an Y axis direction scanning mirror 21 (as shown in FIG. 4). The Y axis direction scanning mirror 21 is rotatable about an axis extending in the leftward and rightward direction (X axis direction) and is operable to reflect the laser beam L from the X axis direction scanning mirror 20 towards a scanning lens 22.

Figure 5:
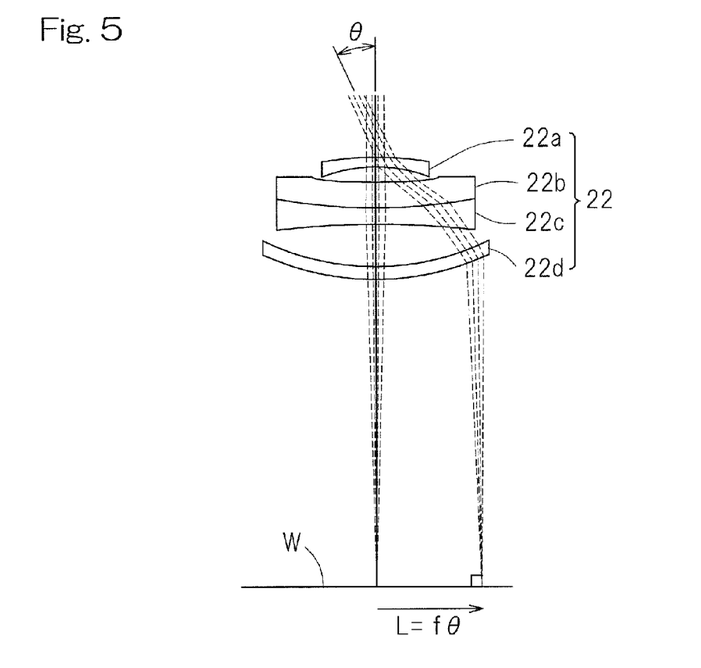
FIG. 5 is an explanatory diagram showing a function of the scanning lens provided in the optical system head.

The scanning lens 22 is a lens aggregation preferably including a plurality of lenses 22a, 22b, 22c and 22d and is configured to condense the laser beam L, which has been deflected by the X axis direction scanning mirror 20 and the Y axis direction scanning mirror 21 and then irradiate the target object W to be processed. At this time, as shown in FIG. 5, change of an angle of incidence θ and a scanning distance L on the target object W to be processed are so chosen as to become proportional in any of the X axis direction and the Y axis direction (i.e., L=fθ). Also, regardless of the size of the angle of incidence θ, the laser beam L condensed is caused to irradiate the target object W to be processed in a vertical direction at all times. The scanning lens 22 of the kind referred to above is called a telecentric F–θ scanning lens.

The deflecting direction adjusting unit 16 includes an X axis direction scanning motor 23 configured to rotate the X axis direction scanning mirror 20 reversibly in positive and negative directions about the axis extending in the upward and downward direction (Z axis direction) and a Y axis direction scanning motor 24 configured to rotate the Y axis direction scanning mirror 21 reversibly in positive and negative directions about the axis extending in leftward and rightward directions (X axis direction). Those motors 23 and 24 are fixed to the optical system head housing 17 at a location outside such housing 17.

Referring to FIG. 2, the nozzle holding head 4 includes a cutting nozzle 26 configured to blow a cutting gas at a site of the target object W to be processed, at which the laser beam is irradiated, and a nozzle position adjusting unit 27 configured to adjust the position of the cutting nozzle 26 in a plane parallel or substantially parallel to the target object W to be processed in synchronism with the operation of the deflecting direction adjusting unit 16.

Figure 6:
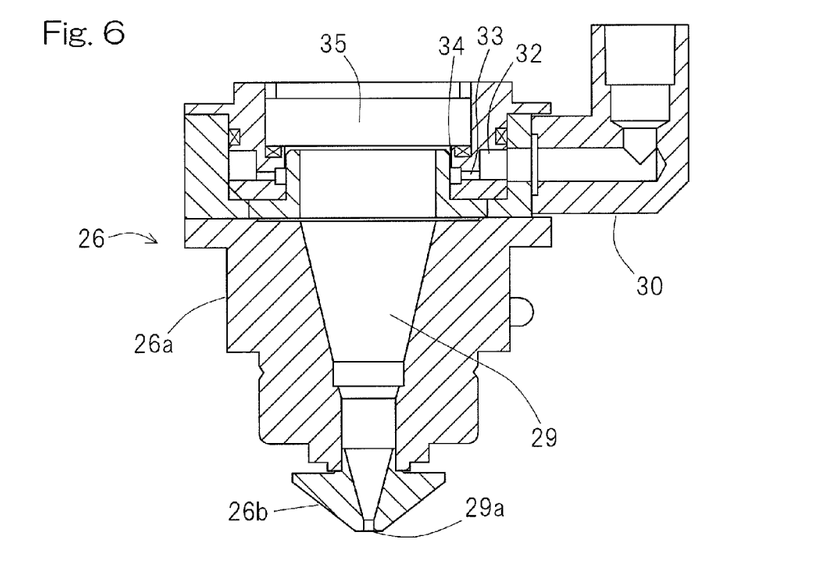
FIG. 6 is a sectional view showing a cutting nozzle provided in the nozzle holding head.

As shown in a sectional view of FIG. 6, the cutting nozzle 26 is of a type in which a blow-off aperture member 26b is fitted to a lower end of a nozzle main body 26a. The nozzle main body 26a and the blow-off aperture member 26b preferably include a vertical through hole 29 defined therein so as to extend through them in the upward and downward direction. This vertical throughhole 29 is of a shape being tapered gradually towards the lower end, and a blow-off aperture 29a at the lower end thereof is rendered to have a minute nozzle size. A hose connecting tube 30 is fitted to an upper side surface portion of the nozzle main body 26a and, through a hose 31 (FIG. 2) connected with this hose connecting tube 30, the cutting gas is supplied from a cutting gas supply source (not shown), provided at the outside, to the cutting nozzle 26. The cutting gas so supplied is uniformly jetted from a lower end of a protection lens 36 towards a nozzle axis through an annular groove 32, a plurality of small diametric holes 33 and circumferential gaps 34, is then discharged into the vertical throughhole 29 and is finally blown off from the blown-off aperture 29a in the vertical throughhole 29 towards the target object W to be processed.

Figure 7:
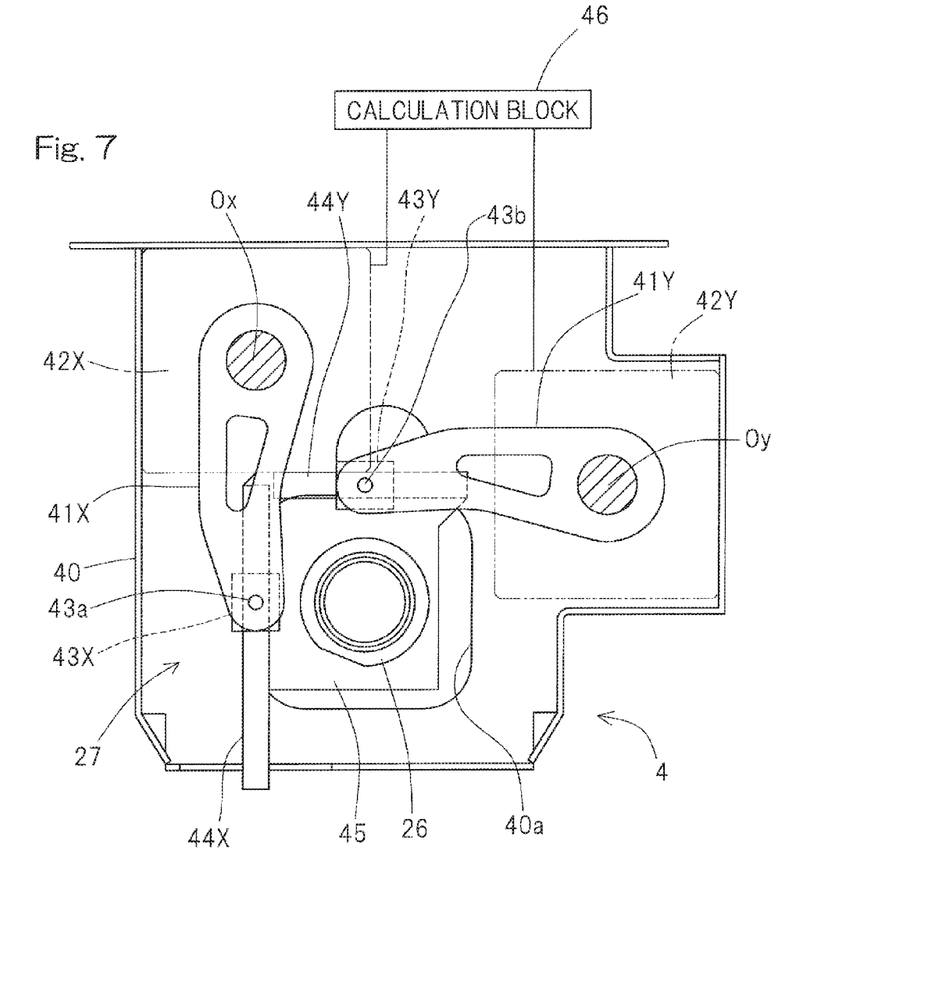
FIG. 7 is a top plan view showing the nozzle holding head.

A structure of the nozzle position adjusting unit 27 is shown in a top plan view in FIG. 7. In other words, two pivot arms 41X and 41Y pivotable about respective shaft axes OX and OY, both extending in the upward and downward direction at right angles to the target object W to be processed, are provided in a base member 40 supported by the optical system nozzle support member 12. Those pivot arms 41X and 41Y are pivoted respectively by pivot drive sources 42X and 42Y. Respective pivot ends of those pivot arms 41X and 41Y are provided respectively with respective pivotable sliders 43X and 43Y, each pivotable about a corresponding shaft 43a or 43b extending in the upward and downward direction. Those sliders 43X and 43Y are slidably straddled over respective guide rails 44X and 44Y that extend in the Y axis direction and the X axis direction, respectively.

The guide rails 44X and 44Y are installed on an upper surface of a plate 45 that is provided integrally with the cutting nozzle 26. In other words, the guide rails 44X and 44Y are fixed indirectly to the cutting nozzle 26 so as to lie parallel or substantially parallel to and perpendicular or substantially perpendicular to the target object W to be processed. The base member 40 referred to above is formed with an opening 40a into which a lower portion of the cutting nozzle 26 is inserted.

When the pivot arms 41X and 41Y are pivoted by the respective pivot drive sources 42X and 42Y, the sliders 43X and 43Y of the pivot arms 41X and 41Y, while being moved along the guide rails 44X and 44Y, have their positions converted into lengthwise and perpendicular or substantially perpendicular directions, respectively. Accordingly, the cutting nozzle 26 fixed to the guide rails 44X and 44Y through the plate 45 also undergoes a position conversion. Since the two guide rails 44X and 44Y extend perpendicular or substantially perpendicular to each other, the pivotal movement of each of the pivot arms 41X and 41Y results in the position conversion of the cutting nozzle 26 in two directions perpendicular or substantially perpendicular to each other. Therefore, when the two pivot arms 41X and 41Y are pivoted an appropriate angle, the cutting nozzle 26 is configured to be positioned at an arbitrarily chosen target position.

The pivot drive sources 42X and 42Y are controlled according to an operating decision by a calculation block 46. In other words, the calculation block 46 is configured and programmed to make a decision of which one of operations the nozzle position adjusting unit 27 should perform, and then to control the pivot drive sources 42X and 42Y. Such operations include an operation to adjust in synchronism with the operation of the deflecting direction adjusting unit 16 and an operation to withdraw the cutting nozzle 26 to out of a processing region R (shown in FIG. 8A).

The pivot arms 41X and 41Y are in parallel or substantially parallel relation to each other and, whichever the pivot arm 41X or the pivot arm 41Y is pivoted, loads equal or nearly equal to each other acts on those pivot drive source 42X and 42Y. For this reason, without allowing the position conversion of one of them in the axial direction not to affect the position conversion of the other of them, the positioning in the two axis directions perpendicular or substantially perpendicular to each other is accomplished with the same accuracy. In other words, it is possible to eliminate an accumulation of errors which often occurs in the standard series relation (a piggy-back structure).

The nozzle position adjusting unit 27 may not be necessary limited to that shown in and described in connection with the above preferred embodiment. By way of example, the use may be made of an X axis slide body (not shown) slidable in the X axis direction relative to the base member 40 and, also, of a Y axis slide body (also not shown) slidable in the Y axis direction relative to the X axis slide body referred to above, and the cutting nozzle 26 may be provided in the Y axis slide body. The positional relationship between the X axis slide body and the Y axis slide body may be reverse to that described above. Even with this alternative structure, the cutting nozzle 26 is configured to be positioned at the arbitrarily chosen target position. It is, however, to be noted that in the case of this construction, the axes have the serial relation (piggy-back structure) and, therefore, errors may accumulate.

Figure 8A:
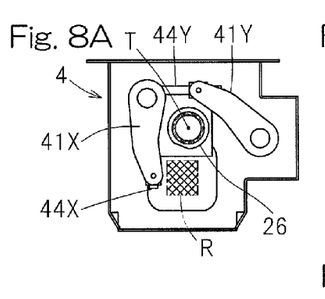
FIGS. 8A to 8J are top plan views of the nozzle holding head, showing different conditions in which the cutting nozzle assumes respective top plan positions.
Figure 8B:
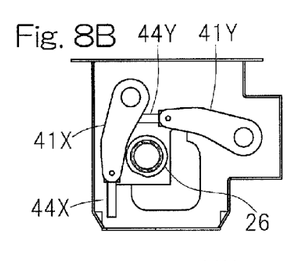
Figure 8C:
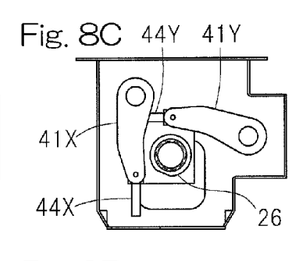
Figure 8D:
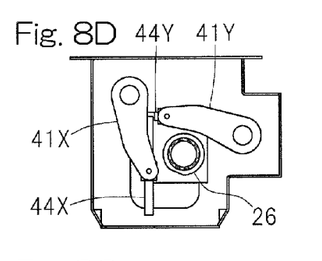
Figure 8E:
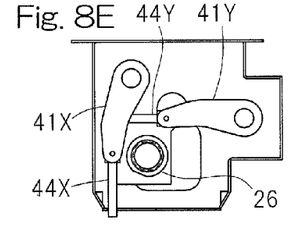
Figure 8F:
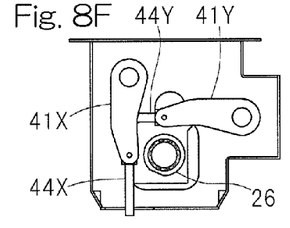
Figure 8G:
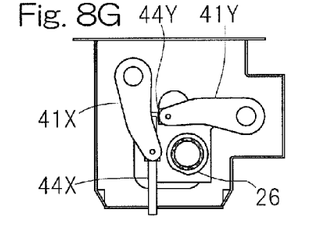
Figure 8H:
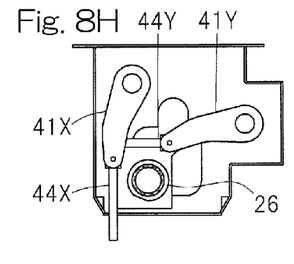
Figure 8I:
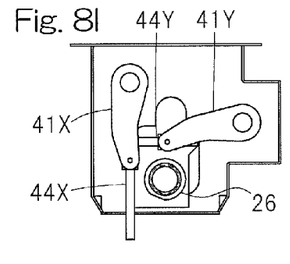
Figure 8J:
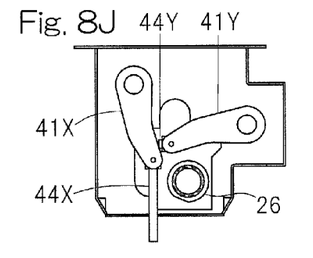

FIGS. 8A to 8J illustrate relations between the angular position of the pivot arms 41X and 41Y and the top plan position of the cutting nozzle 26. In particular, FIG. 8F illustrates the cutting nozzle 26 held at the position of origin (X=0, Y=0). Starting from this condition, when the pivot arm 41X pivots in a direction rightward as viewed in FIGS. 8A-8J, the cutting nozzle 26 moves in the positive direction of the X axis as shown in FIGS. 8D, 8G and 8J, but when the pivot arm 41X pivots in a direction leftward as viewed in FIGS. 8A-8J, the cutting nozzle 26 moves in the negative direction of the X axis as shown in FIGS. 8B, 8E and 8H. Also, when the pivot arm 41Y pivots in an upward direction as viewed in FIGS. 8A-8J, the cutting nozzle 26 moves in the positive direction of the Y axis as shown in FIGS. 8B, 8C and 8D, but when the pivot arm 41Y pivots in a downward direction as viewed in FIGS. 8A-8J, the cutting nozzle 26 moves in the negative direction of the Y axis as shown in FIGS. 8H, 8I and 8J.

In the conditions shown in FIGS. 8B to 8J as described above, the cutting nozzle 26 resides within the processing region R in which the cutting gas is blown to the target object W to be processed. The processing region R is an area shown by the cross hatching in FIG. 8A. In addition, when the pivot arm 41Y is set to a particular angular position and the pivot arm 41X is greatly pivoted, the cutting nozzle 26 is withdrawn to a retracted position T which lies out of the processing region R as shown in FIG. 8A.

The adjustment of the top plan position of the cutting nozzle 26 by the nozzle position adjusting unit 27 is carried out in synchronism with the adjustment of the deflecting direction of the laser beam L by the previously described deflecting direction adjusting unit 16. By so doing, the cutting nozzle 26 is brought in position to blow the cutting gas onto the site of the target object W to be processed, at which the laser beam is irradiated. At this time, the laser beam L, which has been deflected by the focusing optical system 15 for the laser beam L, is projected onto the target object W to be processed through the vertical throughhole 29 in the cutting nozzle 26.

Figure 9:
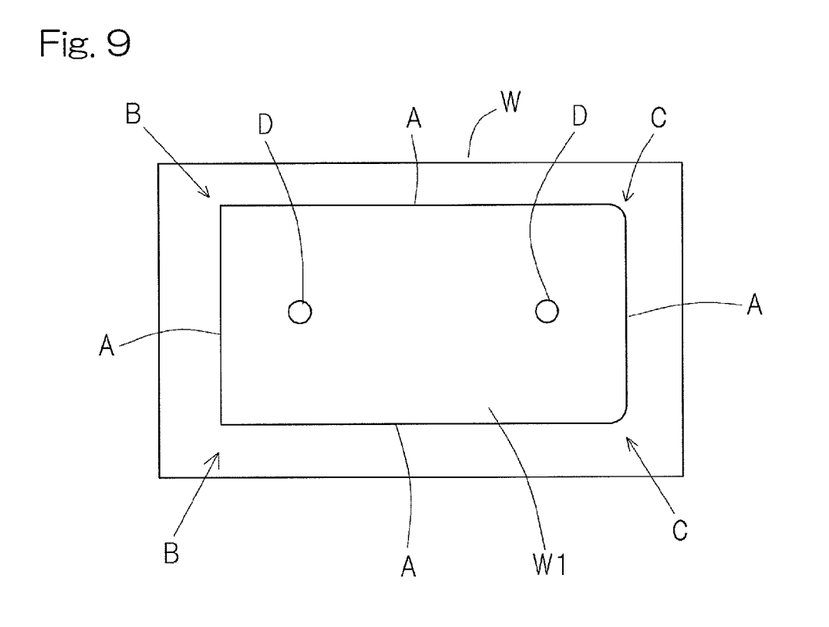
FIG. 9 is a diagram showing one example of a cutting process of a target object to be processed.

One example of the processing performed by the laser processing machine according to a preferred embodiment of the present invention will be described with particular reference to FIG. 9. FIG. 9 illustrates an example in which a rectangular or substantially rectangular plate member W1 having right angled corners and arcuately chamfered corners is cut out from the target object W to be processed and subsequently round holes are opened within the plate member W1. The processing is performed with the target object W to be processed fixedly placed on the table 2. Regarding a straight portion A having a long distance, by moving the optical system head 3 and the nozzle holding head 4 via the XYZ axis moving mechanism 5, the processing is performed while the irradiating position of the laser beam L on the target project W to be processed is moved at a high speed. Also, regarding the right angled corners B and the arcuately chamfered corners C as well as the round holes D, by adjusting the angle of deflection of the laser beam L via the deflecting direction adjusting unit 16, the processing is carried out while the irradiating position of the laser beam L on the target object W to be processed is finely adjusted.

The optical system head 3 and the nozzle holding head 4 are structured with a number of component elements and are therefore relatively heavy in weight. For this reason, moving the optical system head 3 and the nozzle holding head 4 via the XYZ axis moving mechanism 5 results in a large inertia force acting thereon to such an extent that difficulty is encountered in carrying out a precise change of direction and the acceleration or deceleration. In contrast thereto, according to the present preferred embodiment, since the adjustment of the angle of deflection of the laser beam L is accomplished by merely rotating the X and Y axis direction scanning mirrors 20 and 21 which are lightweight, it can be accomplished with a small driving force and therefore, a highly responsive adjustment is achieved. For this reason, the processing of a complicated shape is performed efficiently. Therefore, the combined utilization of the movement of the optical system head 3 and the nozzle holding head 4 in the three, X, Y and Z axis directions by the XYZ axis moving mechanism 5 and the adjustment of the deflecting direction of the laser beam L by the deflecting direction adjusting unit 16 makes it possible to accomplish both of the processing of a long distance region of the simple shape and the processing of a short distance region of the complicated shape efficiently.

Where the target object W to be processed has a plate thickness equal to or greater than a definite thickness (for example, about 0.8 mm in the case of the output of the laser beam L being about 2 kW), the cutting nozzle 26 has to be positioned within the processing region R and, on the other hand, the cutting gas has to be blown onto the site of the target object W to be processed at which the laser beam L is projected. By so doing, a molten metal is blown off downwardly to permit the cutting process to take place smoothly.

Where the plate thickness of the target object W to be processed is smaller than the definite thickness, metal at the cutting site is evaporated by the effect of heat evolved at the time of processing, and no molten metal is therefore generated. For this reason, there is no need to blow the cutting gas from the cutting nozzle 26. Accordingly, in such case, the cutting nozzle 26 has to be withdrawn to the retracted position T (shown in FIG. 8A). Even where a welding process and a marking process are performed, the cutting nozzle 26 is withdrawn to the retracted position T.

Also, in this laser processing machine of the present preferred embodiment, since the optical system head 3 and the nozzle holding head 4 need to be separately supported by the optical system nozzle support member 12, transmission of vibrations, induced in the cutting nozzle 26 provided in the nozzle holding head 4, to the focusing optical system 15 provided in the optical system head 3 is rendered difficult. More specifically, they may be supported through a vibration isolating material. Also, the support structure of them may be so designed as to have a high natural frequency. Accordingly, adverse influences on the deflection of the laser beam L by the focusing optical system 15 are significantly reduced or prevented. For this reason, the highly accurate cutting processing is accomplished.

Although the focusing optical system 15 referred to in connection with the present preferred embodiment preferably adjusts the direction of deflection of the laser beam L about the two axis directions perpendicular or substantially perpendicular to each other, it may be designed to adjust about three axis directions perpendicular or substantially perpendicular to each other. By so doing, the processing is performed on the target object W to be processed which is not a flat plate.

Also, although the foregoing preferred embodiment has been shown and described having such a structure that, the target object W to be processed preferably is fixed in position and the optical system head 3 and the nozzle holding head 4 are relatively moved relative to the target object W to be processed, an alternative structure may be possible in which the optical system head 3 and the nozzle holding head 4 are fixed in position while the target object W to be processed is relatively moved relative to the optical system head 3 and the nozzle holding head 4.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of this specification. Accordingly, such changes and modifications are, unless they depart from the scope of the present invention as determined by the attached claims, to be construed as included therein.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A laser processing machine comprising:
an optical system head including a focusing optical system configured to irradiate a target object to be processed by deflecting and condensing a laser beam incident thereupon, and a deflecting direction adjuster configured to adjust a direction of deflection of the laser beam from the focusing optical system about at least two axes perpendicular or substantially perpendicular to each other;
a nozzle holding head including a cutting nozzle configured to blow a cutting gas to a site of the target object to be processed which is irradiated by the laser beam, and a nozzle position adjuster configured to adjust a position of the cutting nozzle in a top plan parallel or substantially parallel to the target object to be processed in synchronism with an operation of the deflecting direction adjuster; and
an optical system nozzle support member configured to be selectively advanced or retracted relative to the target object in three axis directions perpendicular or substantially perpendicular to each other; wherein
any optical system head and any nozzle holding head in the laser processing machine are separately supported by the optical system nozzle support member;
the nozzle position adjuster is configured to perform a first operation to withdraw the cutting nozzle out of a region, in which the cutting gas is blown to the target object to be processed, separately from a second operation to adjust the position of the cutting nozzle in synchronism with the operation of the deflecting direction adjuster during processing of the target object to be processed; and
the laser processing machine further comprises a calculation block configured to determine which one of the first and second operations the nozzle position adjuster should perform based on a plate thickness of the target object to be processed.

2. A laser processing machine comprising:
an optical system head including a focusing optical system configured to irradiate a target object to be processed by deflecting and condensing a laser beam incident thereupon, and a deflecting direction adjuster configured to adjust a direction of deflection of the laser beam from the focusing optical system about at least two axes perpendicular or substantially perpendicular to each other;
a nozzle holding head including a cutting nozzle configured to blow a cutting gas to a site of the target object to be processed which is irradiated by the laser beam, and a nozzle position adjuster configured to adjust a position of the cutting nozzle in a top plan parallel or substantially parallel to the target object to be processed in synchronism with an operation of the deflecting direction adjuster; and
an optical system nozzle support member configured to be selectively advanced or retracted relative to the target object in three axis directions perpendicular or substantially perpendicular to each other; wherein
the optical system head and the nozzle holding head are separately supported by the optical system nozzle support member; and
the nozzle position adjuster comprises:
two pivot arms arranged in a base member, which is supported by the optical system nozzle support member, so as to pivot about an axis perpendicular or substantially perpendicular to the target object to be processed;
two pivot drive sources configured to pivot the respective two pivot arms; and
two guide rails fixed directly or indirectly to the cutting nozzle so as to lie parallel or substantially parallel to and perpendicular or substantially perpendicular to the target object to be processed, the two guide rails being configured to slidingly guide respective pivot ends of the two pivot arms.

3. The laser processing machine as claimed in claim 1, wherein the nozzle position adjuster comprises:
two pivot arms arranged in a base member, which is supported by the optical system nozzle support member, so as to pivot about an axis perpendicular or substantially perpendicular to the target object to be processed;
two pivot drive sources configured to pivot the respective two pivot arms; and
two guide rails fixed directly or indirectly to the cutting nozzle so as to lie parallel or substantially parallel to and perpendicular or substantially perpendicular to the target object to be processed, the two guide rails being configured to slidingly guide respective pivot ends of the two pivot arms.

4. The laser processing machine as claimed in claim 1, wherein
the optical system head and the nozzle holding head are spaced apart from each other;
the optical system head is connected by a first fastening member to an upper portion of the optical system nozzle support member; and
the nozzle holding head is connected by a second fastening member to a lower portion of the optical system nozzle support member.

* * * * *